United States Patent
Kunii

(10) Patent No.: US 7,108,465 B2
(45) Date of Patent: Sep. 19, 2006

(54) JIG PLATE

(75) Inventor: Kazukane Kunii, Aichi pref. (JP)

(73) Assignee: Yamazaki Mazak Corporation, Aich. Pref. (JP)

( * ) Notice: Subject to any disclaimer, the term of this patent is extended or adjusted under 35 U.S.C. 154(b) by 13 days.

(21) Appl. No.: 10/950,980

(22) Filed: Sep. 27, 2004

(65) Prior Publication Data

US 2005/0073116 A1  Apr. 7, 2005

(30) Foreign Application Priority Data

Oct. 7, 2003  (JP) .............................. 2003-348159

(51) Int. Cl.
B23Q 3/06 (2006.01)
B23Q 3/30 (2006.01)

(52) U.S. Cl. .................. 409/219; 279/143; 29/33 P

(58) Field of Classification Search ................ 409/219, 409/225; 29/33 P; 279/143, 145
See application file for complete search history.

(56) References Cited

U.S. PATENT DOCUMENTS

| | | | | |
|---|---|---|---|---|
| 986,829 A * | 3/1911 | Kasperson | ................... | 279/103 |
| 1,340,741 A * | 5/1920 | Schmelzer | ................... | 409/219 |
| 3,521,511 A * | 7/1970 | Beckers et al. | ................ | 82/147 |
| 4,637,108 A * | 1/1987 | Murata et al. | ................ | 29/33 P |
| 4,662,043 A * | 5/1987 | Stone et al. | ................. | 29/33 P |
| 4,688,810 A * | 8/1987 | Waite | ........................ | 279/143 |
| 4,934,680 A * | 6/1990 | Schneider | ................... | 269/309 |
| 5,415,384 A * | 5/1995 | Obrist et al. | ................. | 269/309 |
| 5,816,585 A * | 10/1998 | Schenk | ........................ | 279/125 |
| 5,893,689 A * | 4/1999 | Juhasz | ..................... | 408/239 A |
| 6,139,002 A | 10/2000 | Stark | | |
| 6,219,893 B1 * | 4/2001 | Nordquist | ................... | 29/33 P |
| 6,276,879 B1 * | 8/2001 | Hecht | ........................ | 409/234 |
| 6,357,974 B1 * | 3/2002 | Robins | ....................... | 408/240 |
| 6,378,877 B1 * | 4/2002 | Luscher et al. | ............ | 279/2.09 |
| 6,799,758 B1 * | 10/2004 | Fries | ......................... | 269/309 |

FOREIGN PATENT DOCUMENTS

| | | |
|---|---|---|
| DE | 195 23 787 A1 | 2/1997 |
| EP | 215353 A2 * | 3/1987 |
| GB | 2272656 A * | 5/1994 |
| JP | 01109033 A * | 4/1989 |
| JP | 2001-001234 | 9/2001 |
| JP | 2001-157937 | 12/2001 |
| WO | 96/31308 | 10/1996 |

OTHER PUBLICATIONS

Chinese Office Action for corresponding Application No. 200410084968.3 dated Mar. 24, 2006.

* cited by examiner

Primary Examiner—Monica Carter
Assistant Examiner—Michael W. Talbot
(74) Attorney, Agent, or Firm—Renner, Otto, Boisselle & Sklar, LLP

(57) ABSTRACT

An end surface 820 of a work 80 gripped by a chuck 50 equipped to a main spindle of a lathe-type machine tool is machined, and at the same time has a screw hole 830 formed thereto. The jig plate 60 is provided with a main body 600 having a fixing surface 630 and an inverse tapered portion 610. The jig plate 60 is provided with a bolt 620, and is fixed to the work 80 by a torque wrench tool 70. A chuck claw 122 of a chuck 120 of the second main spindle grips the inverse tapered portion 610 and processes the remaining surfaces of the work.

6 Claims, 6 Drawing Sheets

FIG. 6(a)
FIG. 6(b)
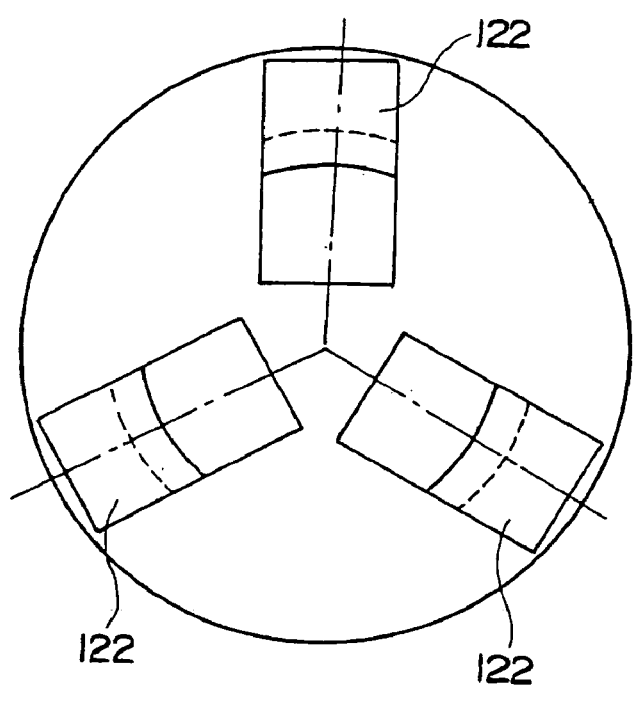
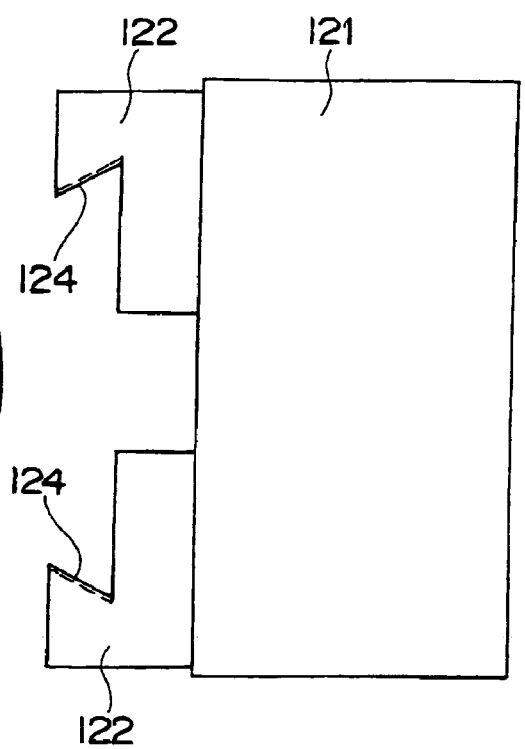

JIG PLATE

The present application is based on and claims priority of Japanese patent application No. 2003-348159 filed on Oct. 7, 2003, the entire contents of which are hereby incorporated by reference.

FIELD OF THE INVENTION

The present invention is related to a jig plate for fixing a work thereto and which is gripped by a main spindle, and more specifically, to a jig plate suitable for application to a system for automatically processing all six surfaces of the work in a lathe-type machine tool or a machining center.

DESCRIPTION OF THE RELATED ART

Conventionally, the method of machining all surfaces of a work using a special purpose machine equipped with a main spindle having a function of changing a pallet having the work mounted thereon and a work table, such as those shown in Japanese Patent Laid-Open Publication No. 2001-1234, is known.

SUMMARY OF THE INVENTION

The object of the present invention is to provide a jig plate to be used in an automatic six-surface processing system that automatically processes all the surfaces of a work including an irregular shaped object such as a cast material, the system equipped with one general-purpose lathe-type machine tool and one general-purpose robot.

In order to achieve the above-mentioned object, the jig plate gripped by a main spindle of a lathe-type machine tool comprises a main body provided with a fixing surface to be detachably fixed to an end surface of a work, and an inverse tapered portion provided to the opposite side of the fixing surface of the main body and gripped by a chuck of the main spindle.

According to the present jig plate, the inverse tapered portion has a common size and shape, and the main body corresponds to the size and shape of the work, and a means for detachably fixing the main body of the jig plate to the end surface of the work is a bolt to be inserted to the main body.

Also, the inverse tapered portion of the jig plate is provided with three notches on the circumference thereof.

BRIEF DESCRIPTION OF THE DRAWINGS

FIG. 6 is an explanatory view of the chuck of the second main spindle.

DETAILED DESCRIPTION OF PREFERRED EMBODIMENTS

Figure 1:
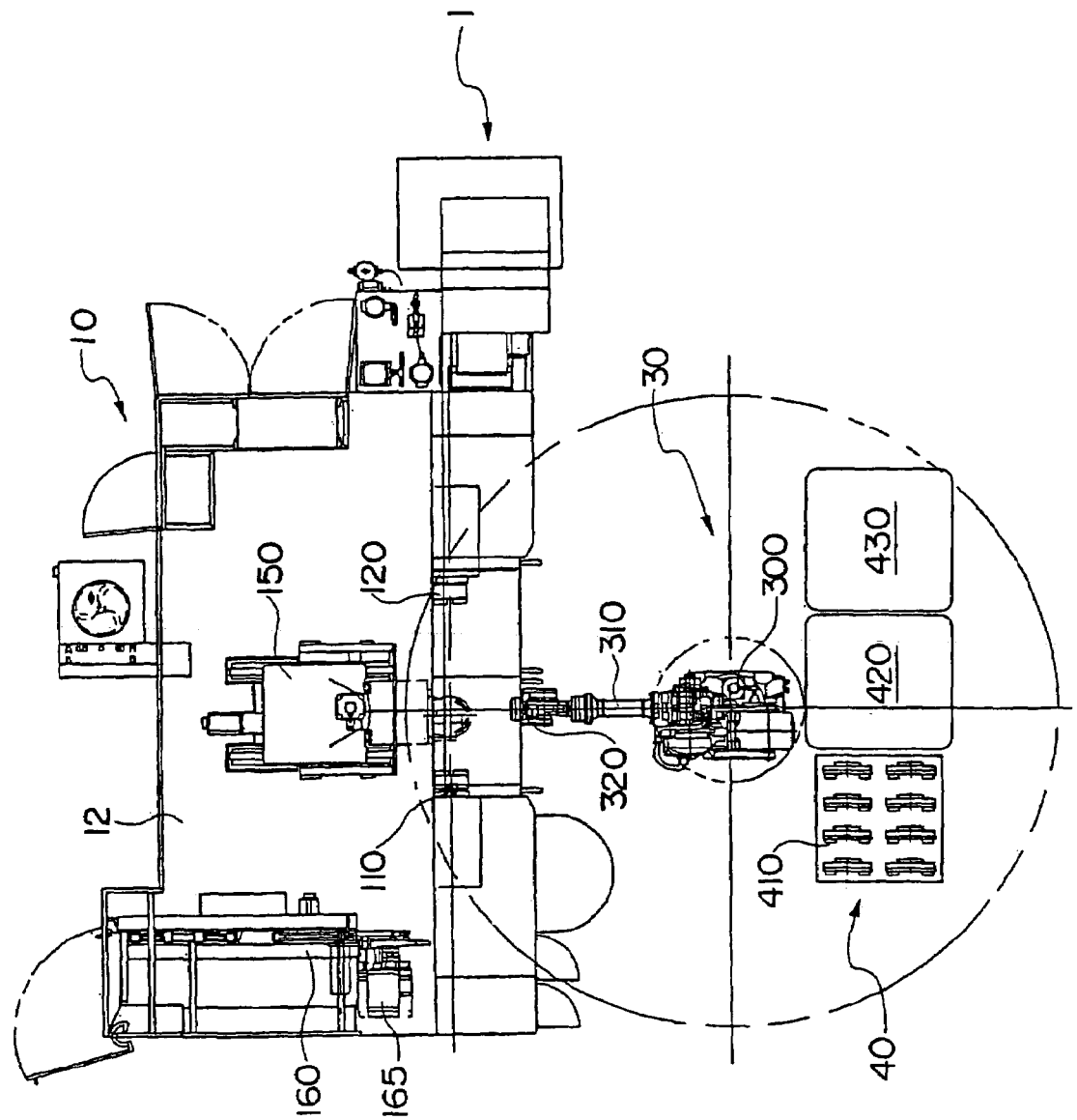
FIG. 1 is a plan view of the automatic six-surface processing system of the present invention.

FIG. 1 is a plan view showing the outline of an automatic six-surface processing system which adopts the present invention.

An automatic six-surface processing system indicated as a whole by reference number 1 is equipped with a lathe-type machine tool 10 and one robot 30. A stage exchange station 40 is provided to the vicinity of the robot 30.

The lathe-type machine tool 10 comprises, on a base 12 thereof, a first main spindle 110 and a second main spindle 120 equipped facing the first spindle 110, and is equipped with a function of delivering a work processed by the first main spindle 110 to the second main spindle 120, and performing subsequent processing to the work.

Between the first spindle 110 and the second spindle 120 on the base 12 of the lathe-type machine tool 10, there is provided a milling main spindle 150. The milling main spindle 150 may be equipped with a rotating tool for milling, a setup tool such as a torque wrench, besides machining tools.

On the base 12 of the lathe-type machine tool 10, there are placed a tool magazine 160 for storing exchange tools, and an automatic tool changer 165, and provides necessary tool to the milling main spindle 150.

The robot 30 comprises a robot main body 300 and a robot arm 310, and transfers the work, the jig or the like by a robot hand 320 attached to the leading end of the robot arm 310.

The stage exchange station 40 is provided with a jig storage 410 and work pallets 420 and 430, and supplies necessary jig and work to the lathe-type machine tool 10 with the robot 30.

Figure 2:
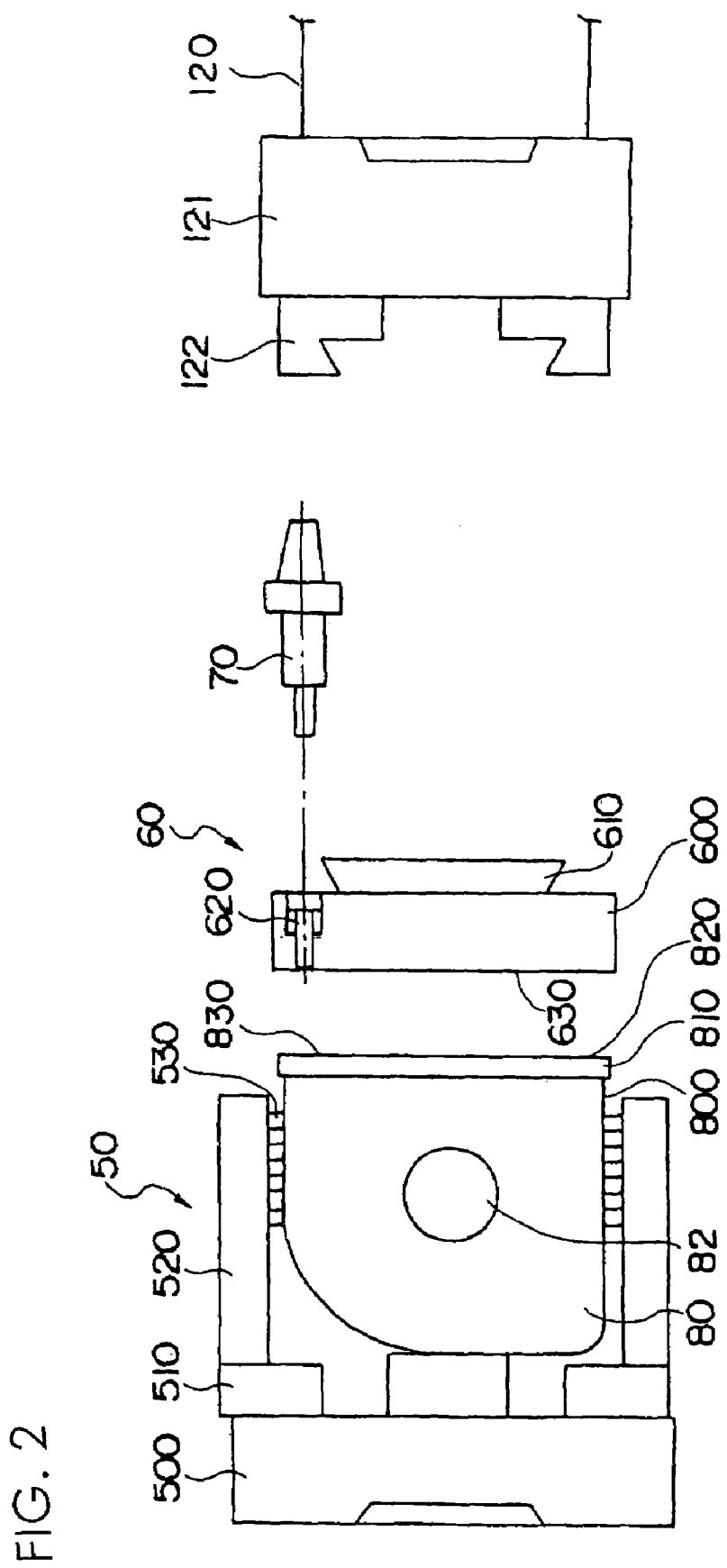
FIG. 2 is an explanatory view indicating the function of the automatic six-surface processing system of the present invention.
Figure 3:
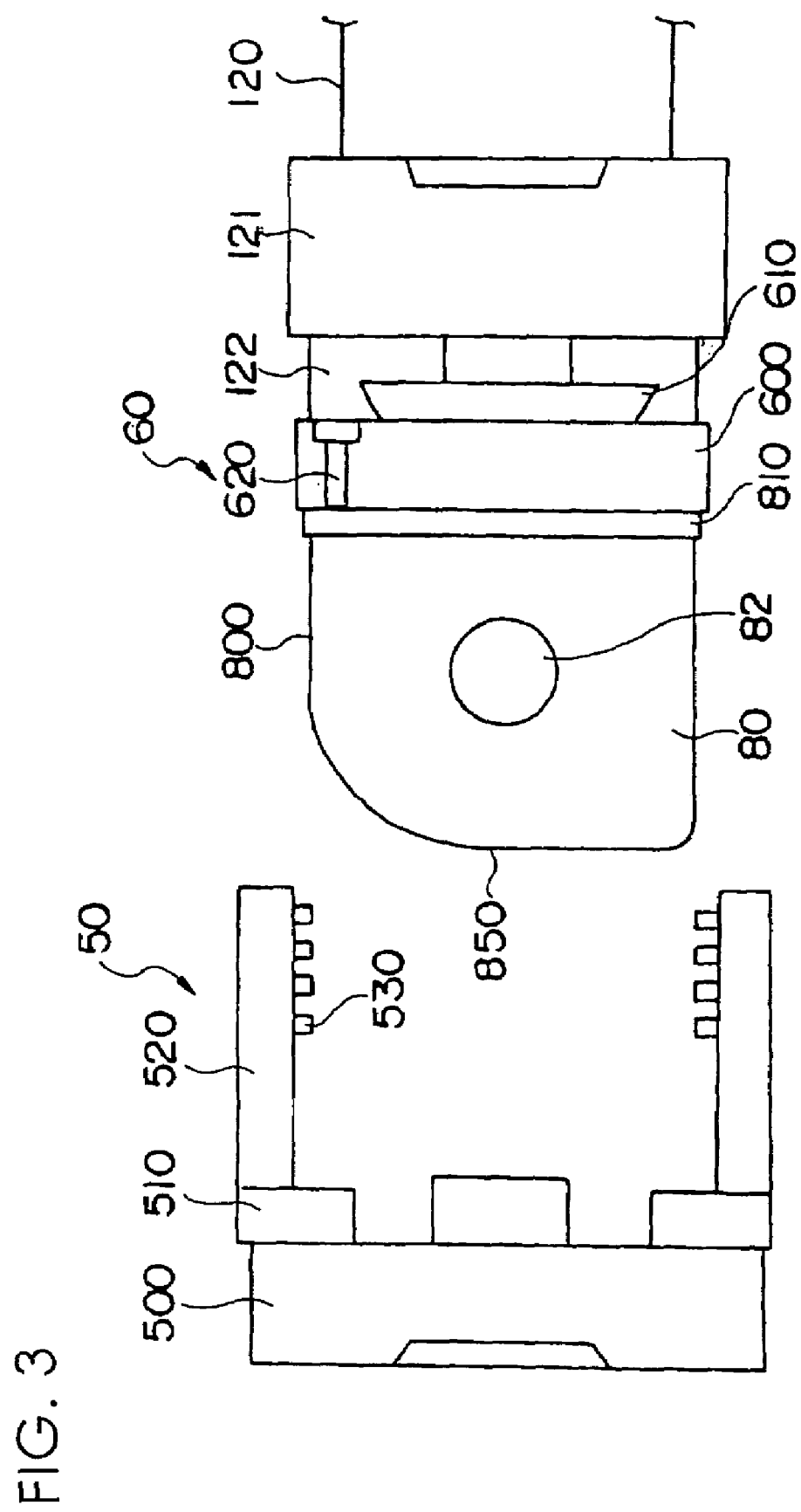
FIG. 3 is an explanatory view indicating the function of the automatic six-surface processing system of the present invention.

FIG. 2 and FIG. 3 are explanatory views showing the processing steps of the automatic six-surface processing system of the present invention.

The first main spindle 110 of the lathe-type machine tool 10 is equipped with a universal chuck with grip range adjuster 50, which is so-called a form lock chuck, and grips a work 80.

The universal chuck with grip range adjuster 50 comprises a main body 500 and a holding member 510, which slidably opens and closes in a radial direction with respect to the main body 500. The holding member 510 supports a clamping member 520, and to the inner side of the clamping member 520, there is provided a plurality of trace pins 530. The work 80 as the object of automatic six-surface processing is, for example, a casting material with a hole 82.

An outer surface 800 of the work 80 is a non-processed cast surface, and does not have a reference plane for gripping. The universal chuck with grip range adjuster 50 grips the work 80 with an appropriate pressure by the trace pins 530 coming into contact with the outer surface 800 of the work 80 at a constant pressure.

When it is inappropriate to perform gripping based on the positioning accuracy of the robot as mentioned above, the universal chuck may be provided at the interior thereof with a patch block or the like.

Under such condition, for example, a machining of the outer circumferential surface 810 and an end surface 820 is performed to the edge portion of the work 80 using the first main spindle 110 and the milling main spindle 150. A screw hole 830 for fixing the jig plate is also machined to the end surface 820.

Next, using the robot 30, a jig plate 60 suitable for the work is transferred from the jig storage 410 of the stage exchange station 40 to the vicinity of the first main spindle 110.

The jig plate 60 is equipped with a main body 600, and an inverse tapered portion 610 of a so-called bayonet structure to the side of the main body 600 facing the second main spindle 120.

The hand of the robot contacts an end surface 630 of the jig plate 60 to the processed end surface 820 of the work 80.

The jig plate 60 comprises a fixing bolt 620, and the center of the fixing bolt 620 is fit to the screw hole 830 for fixing that is processed to the work 80. Then, the torque wrench 70 mounted to the milling main spindle is activated, and the jig plate 60 is automatically attached to the work 80.

Next, as shown in FIG. 3, after the attaching of the jig plate 60 is completed, the second main spindle 120 advances to the first main spindle side, and grips with a chuck claw 122 of a chuck 121 the jig plate 60 integrated with the work 80.

To the cast surface 800 or the hole 82 of the work 80 chucked to the chuck 121 of the second main spindle 120, the milling main spindle performs necessary processing using various tools.

In this process, necessary processing is performed to a leading end surface 850 of the work 80 gripped by the chuck 121 of the second main spindle 120.

That is, even if the work 80 has a shape composed of six surfaces, all six surfaces can be processed automatically by the processing in the condition where the work 80 is gripped by the first main spindle, and the processing in the condition where the work 80 is transferred and gripped by the second main spindle.

The jig plate 60 prepared on the jig storage 410 has the same size and structure to correspond to the common inverse tapered portion 610. The size and structure of the main body 600 differs to correspond to the work.

By fitting the jig plate 60 suitable to the work 80 with the robot to the work having its end surface 820 processed by the first main spindle, the second main spindle is able to perform processing to a different work without the need for a stage exchange.

Figure 4:
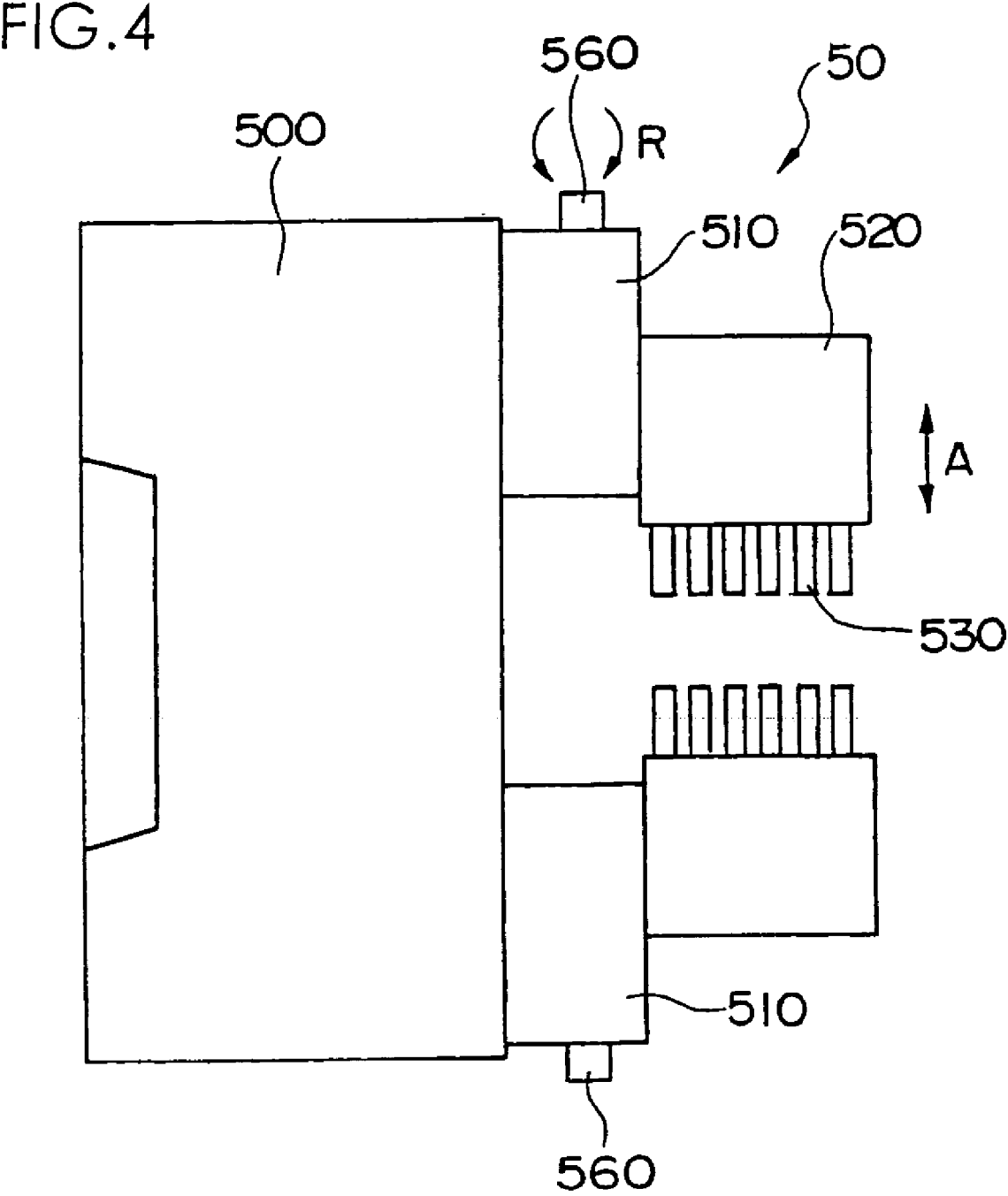
FIG. 4 is an explanatory view of the universal chuck with grip range adjuster.

FIG. 4 is an explanatory view indicating a more detailed structure of the universal chuck with grip range adjuster 50.

The universal chuck with grip range adjuster 50 includes a holding member 510, which opens and closes in the radial direction with respect to the main body 500. A clamping member 520 slidably attached to the holding member 510 moves in the direction of arrow A by rotating an adjust bolt 560 provided to the holding member 510 in the direction of arrow R.

With this adjustment, the initial opening of the trace pin 530 may be adjusted to correspond to the outer diameter size of the work 80.

Figure 5A:
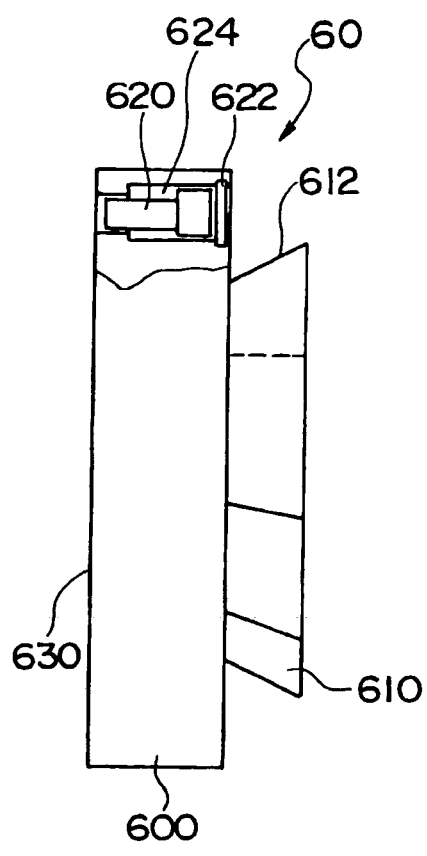
FIG. 5 is an explanatory view of the jig plate.
Figure 5B:
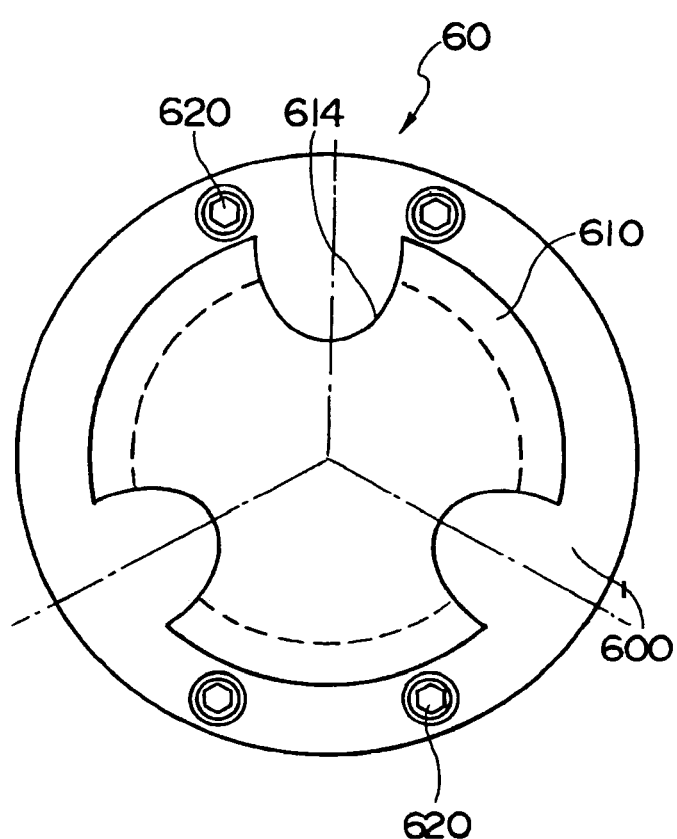

FIG. 5 is an explanatory view showing the detail of the jig plate 60, and FIG. 6 is an explanatory view of a standard chuck 121 of the second main spindle.

The jig plate 60 comprises a main body 600 and an inverse tapered portion 610.

To the main body 600, four bolt holes 624 are provided, and a bolt 620 is inserted to each of the bolt holes 624. To the opening of the bolt hole 624, a C-shaped retaining ring 622 is fitted in order to prevent dropping of the bolt 620.

Three notches 614 are provided to the inverse tapered portion 610. The chuck claw 122 of the second main spindle 120 is provided with three chuck claws that pass through the notches 614 of the inverse tapered portion 610. Therefore, when the second main spindle 120 advances to the side of the first main spindle 110, the rotation phase of the second main spindle is brought into unity with the angle position so that the chuck claws 122 of the chuck 121 of the second main spindle pass through the notches 614 of the inverse tapered portion 610 of the jig plate 60.

After the chuck claws 122 pass the notches 614, the second main spindle is turned 60 degrees to perform chucking, so that the tapered surface 612 of the inverse tapered portion 610 is steadily engaged with the tapered surface 124 of the chuck claw 122 of the second main spindle.

In order to adapt to works having different sizes and shapes, jig plates having different sizes and shapes of the main body 600 of the jig plate 60 are prepared, with a common size and shape for the inverse tapered portion 610. Therefore, it is possible to correspond to various works without the need for stage exchange of the second main spindle.

The shape of the fixing surface 630 of the jig plate, the arrangement of the bolt 620 for fixing of the main body 600 or the like may be varied to correspond to the shape and size of the work.

By having the structure mentioned above, the jig plate of the present invention is capable of performing automatic machining to the irregular shaped work mounted thereto.

Also, even if the work is not irregular shaped, it is attached to the jig plate using a bolt for fixing, so that finishing with higher precision can be performed.

We claim:

1. A jig plate gripped by a main spindle of a lathe-type machine tool, comprising:
   a main body provided with a fixing surface to be detachably fixed to an end surface of a work, and
   an inverse tapered portion provided to an opposite side of the fixing surface and diverging in a direction away from the fixing surface of the main body and gripped by a chuck of the main spindle,
   wherein the inverse tapered portion comprises a plurality of notches arranged to pass therethrough respective chuck claws included in the main spindle,
   wherein when the chuck claws are passed through the notches and relative rotation is provided between the main spindle and the inverse tapered portion, the main body is affixed to the spindle via an engagement between the inverse tapered portion and the chuck claws caused by the relative rotation.

2. The jig plate according to claim 1, wherein the inverse tapered portion has a common size and shape, and the main body corresponds to a size and shape of the work.

3. The jig plate according to claim 1, wherein the means for detachably fixing the main body of the jig plate to the end surface of the work is a bolt being inserted to the main body.

4. The jig plate according to claim 1, wherein the plurality of notches are generally equally spaced about a circumference of the inverse shaped portion.

5. The jig plate according to claim 1, wherein the jig plate includes a plurality of bolt holes in the main body with respective bolts held therein to detachably fix to the end surface of the work.

6. The jig plate according to claim 5, wherein the bolts are held in the respective bolt holes by a C-shaped retaining ring.

* * * * *